P. ELFSTROM.
TRAP.
APPLICATION FILED MAY 11, 1909.
939,818.
Patented Nov. 9, 1909.
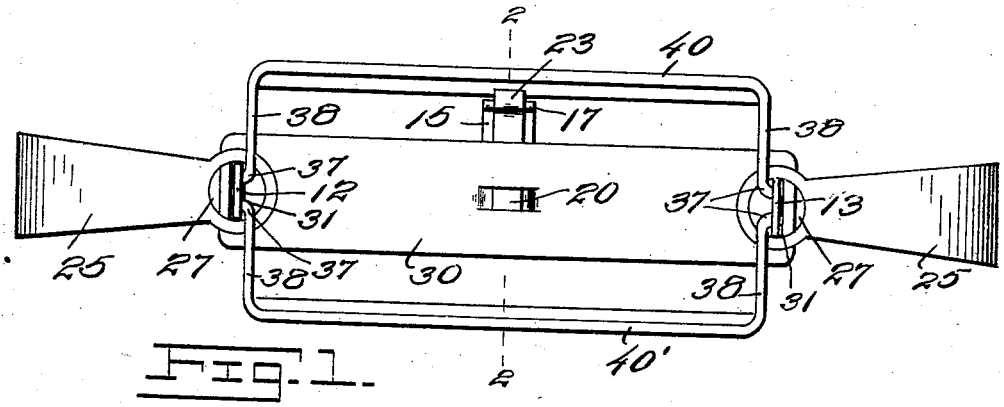
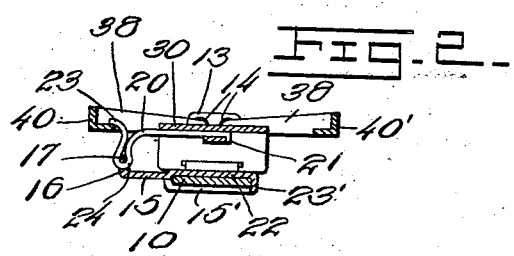
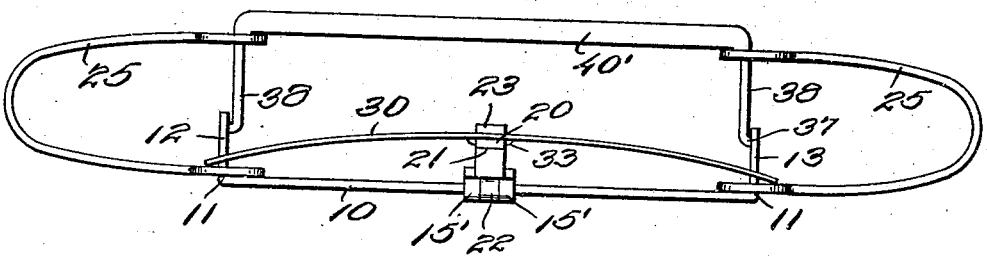
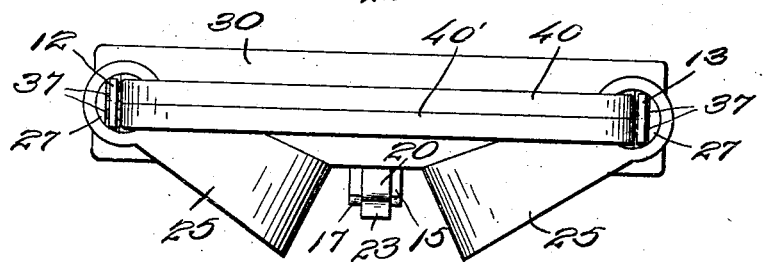
Witnesses
L. L. Armstrong
E. L. Chandlee
Inventor
Paul Elfstrom,
By Woodward & Chandlee
Attorneys

UNITED STATES PATENT OFFICE.

PAUL ELFSTROM, OF HEMMINGTON, MINNESOTA.

TRAP.

939,818.　　　　Specification of Letters Patent.　　Patented Nov. 9, 1909.

Application filed May 11, 1909. Serial No. 495,234.

*To all whom it may concern:*

Be it known that I, PAUL ELFSTROM, a citizen of the United States, residing at Hemmington, in the county of Kittson and State of Minnesota, have invented certain new and useful Improvements in Traps, of which the following is a specification.

This invention relates to certain new and useful improvements in animal traps, of that class in which two gripping jaws are used in connection with two jaw springs, and a spring held trip.

The object of my invention is, to provide a trigger held trap, arranged to be placed in the path likely to be traversed by the animal to be caught.

Another object is to provide a trap so constructed that the jaw springs of the trap can be carried at right angles to the jaws, so that the traps can be formed into neat, compact packages in boxing and packing the same.

Another object is to provide a jaw trap which will be noticeable, because of its extreme simplicity, and which will be positive of operation.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 shows a top view of the trap as set, Fig. 2 shows a view on line 2—2 of Fig. 1, Fig. 3 is a side view of the trap in a sprung or closed condition, Fig. 4 is plan view showing the trap springs turned at right angles to the base bar.

The aim of my invention is, to provide a trap, which is to be placed in the path likely to be taken by the animal to be trapped, and which is covered up with leaves or other suitable material to hide the same, the trap being sprung upon the animal depressing a spring held trip plate.

In the accompanying drawings, the numeral 10 designates a flat bar of suitable length, which has its two ends bent outward to form two guiding ears, which are held in parallel spaced relation, each ear marked 12 and 13 respectively, in the drawings, each ear being provided with two openings as indicated at 14. These ears 12 and 13 are of a width less than the width of the bar 10 so as to provide the stop shoulders 11 at the base of the ears as shown. Secured approximately midlength to this base forming bar 10, is what I term a trigger carrier which is approximately L shaped in cross section, the upstanding member 15 of which is provided with the slot 16, so as to form the bearing bar 17 at the upper end of this trigger carrier. The trigger carrier is slitted so as to provide the tongue 22, while the ends of the side portions 15' of this carrier are recurved to form the clamping shoulders 23' arranged to firmly clasp upon the bar 10. In securing this trigger carrier the bar 10 is placed within the clamping shoulders when the bar 22 is carried downward and forced into a horizontal position upon the upper face of this bar 10 so that this carrier is securely held to the bar.

In connection with my trap, I use two approximately U-shaped springs 25, each spring having its ends provided with an opening 27, of a size to acommodate the guide ears upon which these springs are held as shown. The ends of these springs are held in resilient spaced relation, and they may be pivotally carried to the right or left about these ears 12 and 13, the lower spring ends resting upon the shoulders 11. This is an essential point in connection with my invention, as it permits the trap being folded, as it were, when the same is packed and boxed.

In connection with my trap I use what I term a trip member which is in the form of a curved spring plate or strip 30, each end being provided with a slot 31 so that this spring may be placed upon the guide ears of the base bar 10. Centrally of its ends, I provide the plate 30 with the ear 33, below which is held the trigger arm 20, which has its end bent down as shown at 21 to form a stop and insures the arm being snugly held to this spring trip member. The opposite end of this trigger member is approximately extended at right angles to the lever arm portion 20 and ends in the trigger lip 23, while intermediate of its ends I provide the sleeve 24 arranged to be revolubly held upon the bearing bar 17. In the set condition of the trap the lever or trigger arm extends parallel with the upper face of the base bar 10. Any depression of the trigger plate 30 will result in a rocking of the lever arm 20 and consequent tilting of the trigger lip 23. As shown in the drawings the curved spring trip plate has its ends slidably held about the guide ears and resting upon the lower end of the jaw springs.

The jaws are in the form of two straight bars, which are L-shaped in cross section, and have their ends bent at right angles to form arms which finally terminate in the gudgeon 37, these gudgeons are held within the openings 14 within the guide ears 12 and 13. The combined width of the two bars at each end are of a width less than the width of the guide ears 12 and 13, so that the jaw springs when they fly upward will promptly close these jaws. In the drawings the arms extending from the jaws are marked 38, the jaws being marked 40 and 40'. As shown in the drawings, the trigger lip, is so positioned, that when the jaws are opened in the setting of the trap, this lip 23 will project over the inner edge of one of the jaws, a slight depression then of the trigger plate will trip the trigger arm 36 to carry the lip from over the confined jaw, resulting in the springs flying upward to snap the jaws under force. As the springs are pivotally held upon the guide ears, they can be carried to the right or left, enabling the springs being folded inward to form a neat, compact package when the traps are packed.

From the foregoing description, it will be noted, that no bait is used in connection with my trap, it being intended to set the trap where the animal is likely to step upon the same.

Having thus described my said invention, what I claim as new and desire to secure by United States Letters Patent is:

1. The combination with a flat bar having its ends bent to provide two guiding ears disposed in parallel spaced relation each ear having two openings, said ears being of a width less than the width of said bar, an L-shaped trigger carrier secured to said bar, the upstanding member of said carrier being slotted to provide a bearing bar at the upper end of said carrier, two U-shaped jaw springs having an opening at each end surrounding said guide ears, a curved spring plate having its ends slotted and slidably held upon said ears and between the ends of said jaw springs, a rectangular trigger having a lever arm, an extending trigger lip, and bent upon itself to form a bearing held upon said bearing bar, said lever arm being secured to said spring plate, and two similar jaws having straight meeting edges and arms bent at right angles and ending in gudgeons held within said ear openings, said trigger lip reaching over the edge of one of said jaws when said trap is set.

2. The combination with a base bar having two terminal upstanding guide ears, a trigger plate having its ends slotted and guides upon said guide ears, a trigger carrier secured to said base bar, U-shaped jaw springs having their ends engaged about said ears, two jaws carried by said ears and arranged to be engaged by said jaw springs, and a trigger carried by said trip member engaging one of said jaws.

In testimony whereof I affix my signature, in presence of two witnesses.

PAUL ELFSTROM.

Witnesses:
T. W. SHOGREN,
C. A. RYDIN.